(12) United States Patent
Cross et al.

(10) Patent No.: US 10,320,626 B1
(45) Date of Patent: Jun. 11, 2019

(54) APPLICATION DISCOVERY AND DEPENDENCY MAPPING

(71) Applicant: Wells Fargo Bank, N.A., San Francisco, CA (US)

(72) Inventors: Shane D. Cross, Matthews, NC (US); Jack H. Miller, Denver, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 204 days.

(21) Appl. No.: 15/093,461

(22) Filed: Apr. 7, 2016

(51) Int. Cl.
*H04L 12/24* (2006.01)
*G06F 15/16* (2006.01)
*H04L 12/26* (2006.01)
*H04L 29/12* (2006.01)

(52) U.S. Cl.
CPC .......... *H04L 41/5058* (2013.01); *H04L 41/14* (2013.01); *H04L 43/18* (2013.01); *H04L 61/2007* (2013.01)

(58) Field of Classification Search
CPC . H04L 45/74; H04L 47/2458; H04L 47/2466; H04L 47/25; H04L 63/08; H04L 63/101; H04L 67/02; H04L 69/22; H04L 2029/06054; H04L 12/2814; H04L 67/025; H04L 45/026; H04L 12/2809; H04L 12/2825; H04L 41/0816; H04L 41/0893; H04L 41/5022; H04L 41/5025; H04L 43/0811; H04L 43/0852; H04L 43/103; H04L 51/14; H04L 65/602; H04L 67/10; H04L 67/12; H04L 67/1097; H04L 1/0002; H04L 5/0064; H04L 63/1425; H04L 43/08; H04L 43/16; H04L 41/12; H04L 43/04; H04L 67/306; H04L 41/5009; H04L 43/062; H04L 43/0876; H04L 47/10

See application file for complete search history.

(56) References Cited

U.S. PATENT DOCUMENTS

| | | | |
|---|---|---|---|
| 6,220,768 B1 | 4/2001 | Barroux | |
| 6,247,141 B1 | 6/2001 | Holmberg | |
| 7,152,111 B2 | 12/2006 | Allred et al. | |
| 7,167,912 B1 | 1/2007 | Dhingra | |
| 7,418,498 B2 | 8/2008 | Clubb et al. | |
| 7,466,662 B2 | 12/2008 | Kakivaya et al. | |

(Continued)

FOREIGN PATENT DOCUMENTS

| | | |
|---|---|---|
| EP | 0963076 B1 | 7/2004 |
| WO | 0186906 A2 | 11/2001 |

*Primary Examiner* — Djenane M Bayard
(74) *Attorney, Agent, or Firm* — Shumaker & Sieffert, P.A.

(57) ABSTRACT

In an example, a computer-implemented method includes determining, by one or more processors, a server dependency between a first server and a second server of a multi-server system, where determining the server dependency comprises identifying a bilateral communication between the first server and the second server. The method also includes determining, by the one or more processors, for the determined server dependency, an application dependency between a first application executed at the first server and a second application executed at the second server based on first process information associated with the first application and second process information associated with the second application, and generating data that indicates at least one of the determined server dependency and the determined application dependency.

15 Claims, 7 Drawing Sheets

(56) References Cited

U.S. PATENT DOCUMENTS

| | | | |
|---|---|---|---|
| 7,490,317 B1 * | 2/2009 | Hahn | G06F 8/433 |
| | | | 717/120 |
| 7,562,382 B2 | 7/2009 | Hinton et al. | |
| 7,917,613 B2 | 3/2011 | Letca et al. | |
| 8,024,409 B2 | 9/2011 | Wilson | |
| 8,051,298 B1 | 11/2011 | Burr et al. | |
| 8,260,907 B2 | 9/2012 | O'Sullivan | |
| 2004/0010584 A1 | 1/2004 | Peterson et al. | |
| 2014/0149455 A1 | 5/2014 | Carr et al. | |
| 2015/0007197 A1 * | 1/2015 | Tripp | G06F 9/46 |
| | | | 718/106 |
| 2016/0359678 A1 * | 12/2016 | Madani | H04L 63/1425 |
| 2016/0359705 A1 * | 12/2016 | Parandehgheibi | H04L 63/1425 |
| 2016/0373535 A1 * | 12/2016 | El Defrawy | H04L 67/16 |
| 2017/0193069 A1 * | 7/2017 | Newhouse | G06F 17/30575 |

* cited by examiner

APPLICATION DISCOVERY AND DEPENDENCY MAPPING

TECHNICAL FIELD

The invention relates to determining relationships between computing devices.

BACKGROUND

A networked computing environment may include a number of interdependent servers and processes. For example, a web server application may communicate with a database server application to access files or other information. In this example, the web server application may be said to depend on the database server application to operate properly. A networked computing environment may include a very large number of such dependencies. Accordingly, the process of mapping dependencies between servers and applications in a networked computing environment may be relatively complex.

SUMMARY

In general, this disclosure includes techniques for determining dependencies in a multi-server system. For example, according to aspects of this disclosure, servers throughout the multi-server system may gather communication data associated with outgoing messages from the respective servers. The communication data may indicate a source of the messages and a destination of the messages. According to aspects of this disclosure, the communication data may also include information that may be used to determine an application responsible for generating the messages. Each of the servers may transmit the communications data to a computing device, which may correlate the data to determine server to server relationships, application to server relationships, and/or application to application relationships. The distributed and coordinated nature of the communication data gathering may provide highly reliable and complete dependency data for large multi-server systems.

In an example, a computer-implemented method includes determining, by one or more processors, a server dependency between a first server and a second server of a multi-server system, wherein determining the server dependency comprises identifying a bilateral communication between the first server and the second server, and determining, by the one or more processors, for the determined server dependency, an application dependency between a first application executed at the first server and a second application executed at the second server based on first process information associated with the first application and second process information associated with the second application, and generating data that indicates at least one of the determined server dependency and the determined application dependency.

In another example, a non-transitory computer-readable medium has instructions stored thereon that, when executed, cause one or more processors to determine a server dependency between a first server and a second server of a multi-server system, wherein determining the server dependency comprises identifying a bilateral communication between the first server and the second server, and determine for the determined server dependency, an application dependency between a first application executed at the first server and a second application executed at the second server based on first process information associated with the first application and second process information associated with the second application, and generate data that indicates at least one of the determined server dependency and the determined application dependency.

In another example, a device includes one or more processors of a first server of a multi-server system that are configured to capture network information at a predetermined interval for a predetermined duration, wherein the network information is associated with one or more outgoing messages of the first server and indicates a destination of the one or more outgoing messages, capture process information at the predetermined interval for the predetermined duration, wherein the process information is associated with the one or more outgoing messages of the first server and indicates a process responsible for generating the one or more outgoing messages. The device also includes a memory configured to store the captured network information and the captured process information over the predetermined duration, and the one or more processors are further configured to transmit, at the end of the predetermined duration, the captured network information and the captured process information from the first server to a computing device for determining at least one dependency between the first server and a second server of the multi-server system.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
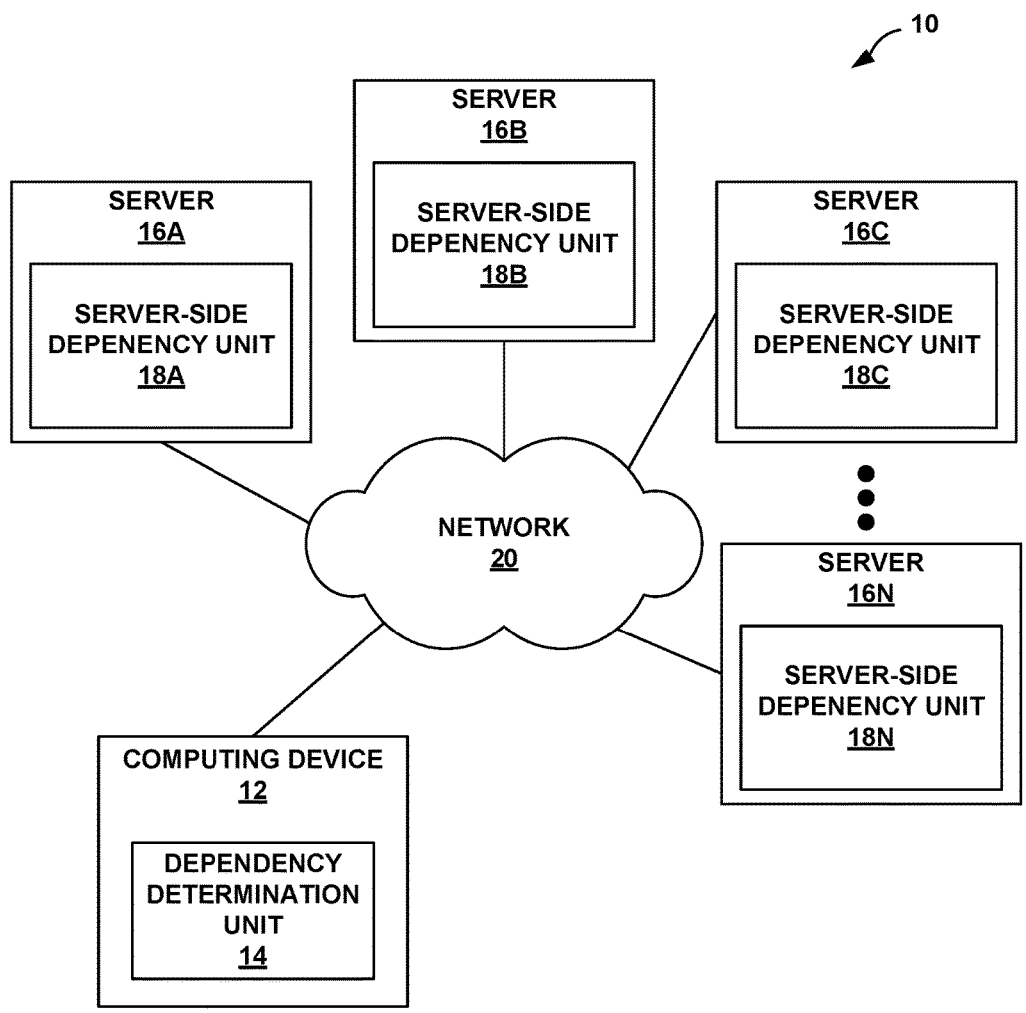
FIG. 1 is a block diagram illustrating an example computing system having a dependency determination unit that is configured to identify network dependencies in accordance with the techniques of this disclosure.

FIG. 1 is a block diagram illustrating an example computing system 10 for identifying network dependencies in accordance with the techniques of this disclosure. The example computing system 10 of FIG. 1 includes a computing device 12 having a dependency determination unit 14. Computing device 12 communicates with servers 16A-16N (collectively "servers 16") each having a respective server-side dependency unit 18A-18N (collectively "server-side dependency units 18") via network 20.

Computing device 12 may include a variety of devices for processing and/or manipulating data. For example, in general, the functionality of computing device 12 may be implemented in a device that includes one or more processing units, such as one or more microprocessors. The functionality of computing device 12 may be implemented in hardware or in a combination of software and hardware, where requisite hardware may be provided to store and execute software instructions. Such hardware may include, for example, a processing unit and a computer-readable storage medium. Other hardware may include digital signal processors (DSPs), application specific integrated circuits (ASICs), field programmable gate arrays (FPGAs), or any other equivalent integrated or discrete logic circuitry, as well as any combinations of such components.

While shown as a single computing device in the example of FIG. 1 for purposes of illustration, in some examples, computing device 12 may include a distributed network of computing devices including one or more databases, file servers, and/or other computing devices. In addition, computing device 12 may include one or more other components for carrying out the techniques described herein, such as one or more other processors, storage units, interfaces to communicate with external devices, input/output devices, or the like.

Dependency determination unit 14 may be responsible for determining dependencies between servers 16 and/or processes being executed on servers 16. In some instances, dependency determination unit 14 may include instructions executed by one or more processors of computing device 12 to perform the functions of dependency determination unit 14. As described herein, a "dependency" may generally refer to a relationship between data or processes being executed by discrete computing devices. For example, server 16A may host a first application that relies on a process being executed or data being stored at server 16B to carry out the functionality of the application. In this example, a dependency is present between server 16A and server 16B, because the application hosted by server 16A depends on server 16B in order to function properly.

Servers 16 may provide processing resources or store data to support a wide variety of applications. The functionality of servers 16 may be implemented in hardware or in a combination of software and hardware, where requisite hardware may be provided to store and execute software instructions. In some examples, servers 16 may include arrays of processing units and/or computer-readable storage medium.

Servers 16 may support a wide variety of services associated with a business. In an example for purposes of illustration, servers 16 may support services associated with a financial institution that offers different banking products, such as checking accounts, savings accounts, and credit accounts; and different lending products, such as home loans, car loans, business loans, student loans, and the like. In some examples, servers 16 may include any combination of application servers, web servers, computing servers, database servers, file servers, media servers, communications servers, or another other computing device capable of sharing processing resources and/or data with other computing devices connected via network 20.

As described in greater detail below, server-side dependency units 18 may be responsible for collecting information that may be used to determine dependencies with other servers and/or applications connected to network 20. Server-side dependency units 18 may include instructions executed by one or more processors of servers 16 to perform the functions of server-side dependency units 18 as described herein. For example, server-side dependency units 18 may include one or more scripts executed by respective servers 16.

Network 20 may comprise a private network that includes, for example, a private network associated with a financial institution, or may comprise a public network, such as the Internet. Although illustrated as a single entity, network 20 may comprise a combination of networks. Computing device 12 and servers 16 may be connected to network 20 via wired and/or wireless links. The links may form part of a packet-based network, such as a local area network, a wide-area network, or a global network such as the Internet. The links may include intermediate routers, switches, base stations, or any other equipment that may be useful to facilitate communication between devices connected to network 20.

As noted above, servers 16 may execute a wide variety of interdependent processes or store data that is accessed by other computing devices connected via network 20. Identifying dependencies between servers 16 may be difficult due to a number of different factors including the number of different servers 16 and the number of different applications being executed by servers 16. Timing challenges may also arise, as some applications may execute on a random or infrequent basis. Accordingly, performing dependency mapping between assets of a computer network such as servers 16 may be a time consuming process that yields inaccurate results. Nevertheless, dependency mapping may be important for a range of uses including, as examples, operational support, change control, business continuity analysis, auditing, and design analysis.

Techniques of this disclosure may be used to determine application to server relationships, server to server relationships, and/or application to application relationships. For example, according to aspects of this disclosure, each server-side dependency unit 18 may perform a function call for state information. The state information may provide details regarding communications between servers 16. In some examples, the state information may include network information and process information. As described in greater detail below, the network information may include details regarding network components used to carry out the communications between servers 16 (e.g., process identifiers, internet protocol (IP) addresses, transmission control protocol (TCP) data, port numbers, or the like). The process information may include details regarding the processes responsible for the communications between servers 16 (e.g., process identifiers, directory information, application identifiers, or the like). In some examples, server-side dependency units 18 may capture the state information at periodic intervals over a given time. Server-side dependency units 18 may be configured to capture the state information at the same time or substantially the same time (e.g., within a given capture tolerance such as 10 or 15 seconds).

In an example for purposes of illustration, server 16A may perform a function call for state information associated with incoming communications. In this example, the state information for server 16A may provide details regarding which other servers 16 (e.g., other servers 16 operating as hosts) are communicating with server 16A, as well as the process that is being used for each communication. Server-side dependency unit 18A may gather the state information at periodic intervals over a given time and may transmit the captured state information to dependency determination unit 14.

Dependency determination unit 14 may receive state information from server-side dependency units 18 and may map dependencies based on the received state information. For example, dependency determination unit 14 may receive network information (e.g., e.g., process identifiers, Internet Protocol (IP) addresses, Transmission Control Protocol (TCP) data, port numbers, or the like) from servers 16 and identify bilateral communication between servers 16 based on the received network information. Dependency determination unit 14 may use the identified bilateral communication to determine server dependencies. For example, dependency determination unit 14 may identify instances in which servers 16 communicate with each other. The communication may occur, in some instances, at the same time or substantially the same time.

In an example for purposes of illustration, dependency determination unit 14 may receive information from server-side dependency unit 18A indicating that server 16A transmitted data to server 16B. Dependency determination unit 14 may also receive information from server-side dependency unit 18B indicating that server 16B transmitted data to server 16A. In this example, dependency determination unit 14 may determine that a server dependency exists between server 16A and server 16B based on the identified bilateral communication between server 16A and server 16B.

Dependency determination unit 14 may also determine application dependencies for a particular determined server dependency. For example, as noted above, dependency determination unit 14 may receive process information (e.g., process identifiers, directory information, application identifiers, or the like) from servers 16. In some examples, the process information may indicate a directory from which the process responsible for one side of the identified bilateral communication is executed. Dependency determination unit 14 may map the directory to a particular application using information that indicates a relationship between the directory and the application (e.g., a fingerprint file indicating relationships between directories and applications associated with such directories). In some instances, the fingerprinting of applications may be derived from application build logs and/or well defined 3rd party software installs.

Continuing with the example above for purposes of illustration, dependency determination unit 14 may receive information from server-side dependency unit 18A indicating a particular directory associated with data transmitted from server 16A to server 16B (e.g., data included in the determined bilateral communication). Dependency determination unit 14 may map the directory to a particular application associated with server 16A. In some examples, determination unit 14 may perform the directory-to-application mapping using a fingerprint file or other information that links the directory to the application associated with the directory.

Dependency determination unit 14 may also receive information from server-side dependency unit 18B indicating a particular directory associated with data transmitted from server 16B to server 16A. In some instances, the communication may occur at the same or substantially the same time. Dependency determination unit 14 may again map the directory to a particular application associated with server 16B using a fingerprint file or other information that links the directory to the application associated with the directory. Dependency determination unit 14 may then determine that an application dependency exists between the determined application associated with server 16A and the determined application associated with server 16B. Dependency determination unit 14 may generate data that indicates at least one of the determined server dependency or the determined application dependency.

In this way, the techniques may include an agent that is executed by hosts (e.g., servers 16) to collect communications data over a given time period, where the communications data indicates messages transmitted from respective hosts. Respective hosts may provide the collected data to dependency determination unit 14, which may determine dependencies between servers 16 and processes executed at servers 16 using the received data. The techniques may provide a technical solution to the above-noted technical problem of identifying network dependencies. For example, by capturing data from multiple points on a network (e.g., each of servers 16), the techniques provide a robust and reliable indication of dependencies that may not be determined using a manual process or a process that is local to a single entity of a network. The techniques may provide a complete view of server to server communications, application to server mapping, and application to application mapping while reducing or eliminating the potential for manual error. The techniques may, in some instances, result in cost savings in determining dependencies, increased accuracy, wide platform support, impact analysis, design analysis, and business continuity planning analysis.

In one example, determined dependencies may be helpful when modifying or maintaining an application ecosystem. For example, an ecosystem may generally refer to a set of applications and/or services that rely on one another (e.g., exchange information or leverage processing capabilities) to complete an end to end function. As an example, a financial services provider may utilize an application ecosystem to carry out check clearing. In this example, an administrator may migrate a particular application of the ecosystem from one application server to another, different application server. The techniques of this disclosure may be used to identify the dependencies associated with the application being migrated prior to performing the migration. An automated or manual process may utilize the determined dependencies to update the components of the ecosystem in order to maintain communication and functionality.

Figure 2:
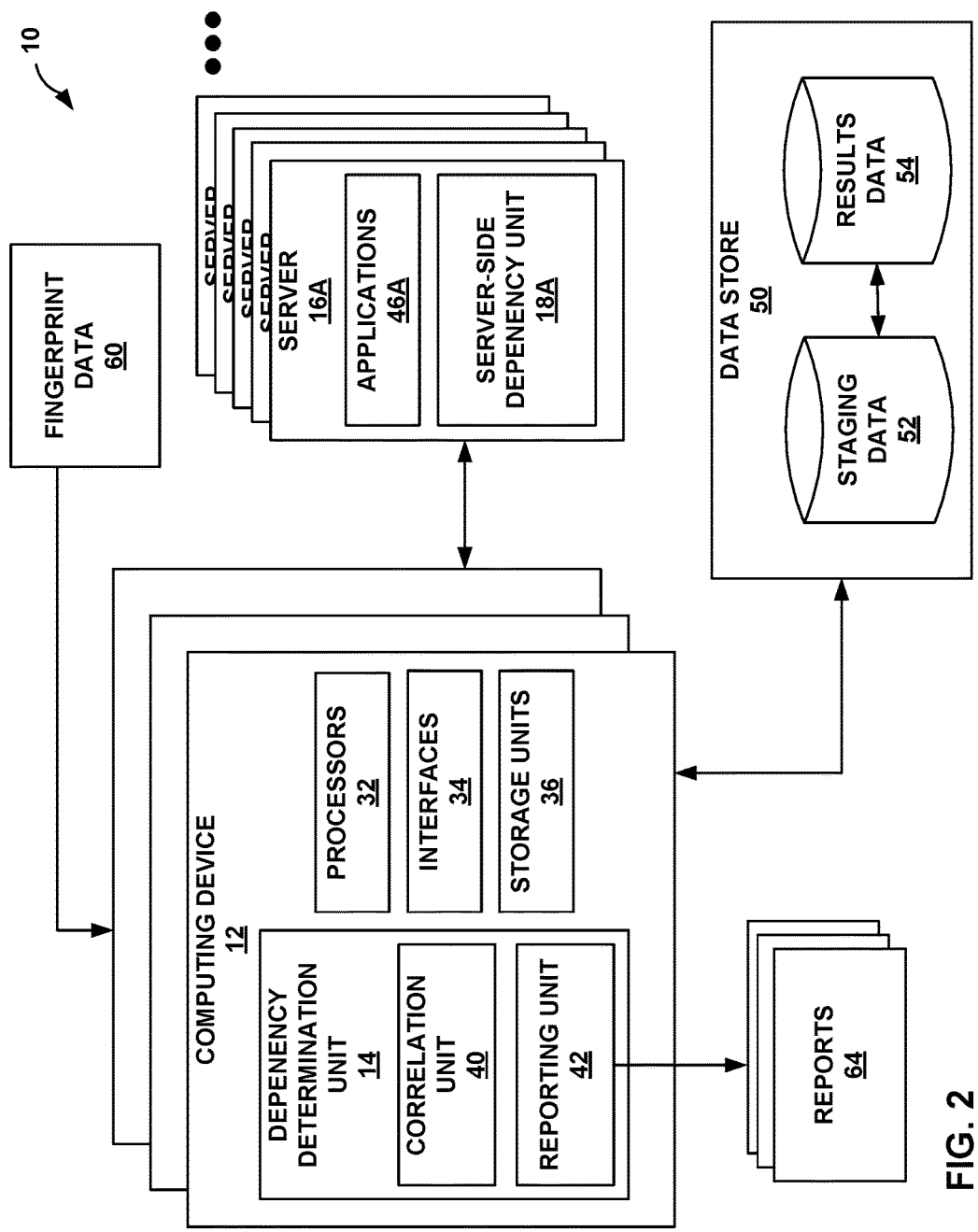
FIG. 2 is a block diagram illustrating another example computing system that is configured to identify network dependencies in accordance with the techniques of this disclosure.

FIG. 2 is a block diagram illustrating several components of computing system 10 in greater detail. For example, in the example shown in FIG. 2, computing device 12 includes dependency determination unit 14, one or more processors 32, one or more interfaces 34, and one or more storage units 36, and dependency determination unit 14 includes correlation unit 40 and reporting unit 42.

The architecture of computing device 12 (and, more broadly, computing system 10) illustrated in FIG. 2 is shown for exemplary purposes only. In other examples, computing system 10 and computing device 12 may be configured in a variety of other ways having additional, fewer, or alternative components than those shown in FIG. 2. For example, while computing device 12 is illustrated in the example of FIG. 1 as a single computing device, the example of FIG. 2 illustrates computing device 12 as having multiple components. In some examples, computing device 12 may include multiple physical or virtual machine servers including a server that hosts an Extract, Transform, and Load (ETL) process and a web server.

As noted above, computing device 12 communicates with servers 16, each having server-side dependency units 18 and applications 46A-46N (collectively, applications 46). Computing device 12 also communicates with data store 50 that stores staging data 52 and results data 54. In addition, in the example of FIG. 2, computing device 12 is configured to receive fingerprint data 60 and output reports 64.

Processors 32, in one example, are configured to implement functionality and/or process instructions for execution within computing device 12. For example, processors 32 may be capable of processing instructions stored by storage units 36. Processors 32 may include, for example, microprocessors, digital signal processors (DSPs), application specific integrated circuits (ASICs), field-programmable gate array (FPGAs), or equivalent discrete or integrated logic circuitry.

Computing device 12 may utilize interfaces 34 to communicate with external devices via one or more wired or wireless connections. In some examples, computing device 12 utilizes interfaces 34 to communicate with external devices such as servers 16 and data store 50. Interfaces 34 may be network interfaces cards, universal serial bus (USB) interfaces, optical interfaces, or any other type of interfaces capable of sending and receiving information via TCP/IP. Examples of such network interfaces may include Ethernet, Wi-Fi, or Bluetooth radios.

Storage units 36 may store an operating system (not shown) that controls the operation of components of computing device 12. For example, the operating system may facilitate the communication of dependency determination unit 14 with processors 32, interfaces 34, and storage units 36. In some examples, storage units 36 are used to store program instructions for execution by processors 32. Storage units 36 may also be configured to store information within computing device 12 during operation. Storage units 36 may be used by software or applications (e.g., dependency determination unit 14) running on processors 32 of computing device 12 to temporarily store information during program execution.

Storage units 36 may include a computer-readable storage medium or computer-readable storage device. In some examples, storage units 36 include one or more of a short-term memory or a long-term memory. Storage units 36 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

According to aspects of this disclosure, as noted above with respect to FIG. 1, each server-side dependency unit 18 may capture information regarding communications with other servers 16. For example, each server-side dependency unit 18 may include one or more scripts executed by processors of servers 16 that cause respective servers 16 to capture and store state information to respective memories of servers 16. The state information may provide details regarding communications (e.g., exchanges of one or more messages) between servers 16.

In some examples, server-side dependency units 18 may interact with dependency determination unit 14 each time the above-noted one or more scripts are executed. For example, server-side dependency units 18 may transmit a call for a configuration file stored by computing device 12 using a Hypertext Transfer Protocol (HTTP) Get message (or a message of another protocol, such as Extensible Messaging and Presence Protocol (XMPP) or Remote Procedure Call (RPC)). The configuration file may include instructions that control the behavior of the one or more scripts. For example, the configuration file may include instructions that cause server-side dependency units 18 to store state information at a predetermined time, to increase or decrease the frequency with which state information is stored, to stop (e.g., kill) the operation of the one or more scripts, or the like.

According to aspects of this disclosure, the state information may include network information and process information associated with outgoing messages from a particular server, such as one of servers 16. For example, the network information may generally include any identifying information that may be used to identify messages transmitted over a network, such as network 20. In some examples, the network information may include a process identifier assigned to the application responsible for an outgoing message. For example, upon an application connecting to a particular server (e.g., server 16A for purposes of illustration), server 16A may create and assign a process identifier to the application (e.g., a Structured Query Language (SQL) Server Process ID (SPID)).

Network information may additionally or alternatively include one or more network identifiers associated with a particular communication protocol. For example, server-side dependency units 18 may capture network identifiers associated with a TCP/IP network. In this example, server-side dependency units 18 may capture source and/or destination IP addresses associated with a particular message. In addition, server-side dependency units 18 may capture source and/or destination TCP port numbers associated with the message. In other examples, server-side dependency units 18 may capture other network information that may be used to identify a source and destination of a particular message transmitted over a network, such as network 20.

According to aspects of this disclosure, as noted above, server-side dependency units 18 may also capture process information. For example, the process information may generally include any information that may be used to identify a process or application responsible for transmitting messages over network 20. In some examples, the process information may include a process identifier, as described above with respect to the network information. The process information may additionally or alternatively include directory information associated with an application responsible for generating the outgoing message. In other examples, server-side dependency units 18 may capture information that may be used to identify an application that generated a particular message being transmitted over network 20.

Server-side dependency units 18 may obtain the state information at periodic intervals. For example, server-side dependency units 18 may be configured to capture state information every minute, every five minutes, every ten minutes, or any other interval that is sufficiently frequent to identify substantially all dependencies. According to aspects of this disclosure, server-side dependency units 18 may capture the state data in a synchronized or nearly synchronized fashion. For example, server-side dependency units 18 may be configured to capture the state information at the same time or substantially the same time within a given capture tolerance (e.g., 10 or 15 seconds). In an example for purposes of illustration, server-side dependency units 18 may each be configured to capture the state information at the top of each minute (e.g., as soon as the clock reads 0:00) using a clock that is local to each of servers 16. In some examples, servers 16 may be synchronized using an enterprise synchronization process.

According to aspects of this disclosure, the periodic intervals with which state information is captured may be configurable. For example, server-side dependency units 18 may each be configured to determine when to capture the state information based on configuration instructions. In one example, as noted above, dependency determination unit 14 may include configuration instructions that specify the interval with which server-side dependency units 18 are to capture state information. In this example, each server-side dependency units 18 may transmit a call to dependency determination unit 14 for the configuration instructions.

In some examples, server-side dependency units 18 may store the captured state information as data entries in a table. Server-side dependency units 18 may also apply a timestamp to each instance of state information. The timestamp may correspond to a time at which an instance of state information is captured. Accordingly, in some examples, a table of state information may be time-indexed according to the time at which each entry of the table is captured. In some instances, server-side dependency units 18 may store the network information and the process information to separate tables and/or files. In other examples, server-side dependency units 18 may store the state information to a single table and/or file.

According to aspects of this disclosure, server-side dependency units 18 may each be configured to store captured state information at respective servers 16 for a particular duration and transmit the stored state information to dependency determination unit 14 at a particular time. For example, server-side dependency units 18 may be configured capture and store state information throughout a particular day (e.g., a 24 hour period) prior to transmitting the state information to data dependency unit 14. In other examples, server-side dependency units 18 may be configured store captured state information for other durations and transmit the stored state information to dependency unit 14 at other intervals, e.g., every 4 hours, every 8 hours, or the like. In some instances, the time and/or frequency with which server-side dependency units 18 transmits state information to dependency determination unit 14 may be dictated by the configuration instructions described above. Server-side dependency units 18 may each be configured to transmit the state information to dependency determination unit 14 using an HTTP Put message (or a message of another communication protocol).

In some examples, server-side dependency units 18 may each remove duplicate state information stored at respective servers prior to transmitting the state information to dependency determination unit 14. For example, server-side dependency units 18 may identify instances in which multiple instances of state information indicate that associated messages have the same network information and process information (e.g., the messages are being transmitted to the same server, same ports, same IP address, and driven by the same directory). In this example, server-side dependency units 18 may remove the duplicate entries, thereby ensuring that each instance of state information corresponds to a unique potential dependency. In other examples, in order to reduce complexity at servers 16, server-side dependency units 18 may send all data to data dependency unit 14 at determined intervals without removing duplicate data entries.

Dependency determination unit 14 may receive the state information from server-side dependency units 18 and may map dependencies based on the received state information. For example, dependency determination unit 14 may receive one or more files containing network information and process information and may determine dependencies based on the received information. Dependency determination unit 14 may determine server to server relationships (e.g., between servers 16), server to application relationships (e.g., between one of servers 16 and one or more applications executed by other servers 16) and/or application to application relationships (e.g., between an application executed by one of servers 16 and one or more applications executed by other servers 16).

For example, according to aspects of this disclosure, correlation unit 40 may identify bilateral communication between servers 16 based on network information received from server-side dependency units 18. Correlation unit 40 may determine server relationships based on the presence of bilateral communication, e.g., in instances in which servers 16 exchange messages. In some examples, correlation unit 40 may identify an exchange of messages between servers 16. For example, correlation unit 40 may, for an outgoing message from a source at a particular instance in time, determine a destination of the message. Correlation unit 40 may then poll the destination to determine whether one or more messages are sent from the destination back to the source. Correlation unit 40 may identify a server relationship between the servers in instances in which the servers exchange messages.

In an example for purposes of illustration, correlation unit 40 may receive state information from server-side dependency unit 18A of server 16A. In some examples, as described above, the state information may be organized in time-indexed entries associated with communications. In such examples, correlation unit 40 may determine, for a particular entry of the state information for server 16A, a remote server that receives the outgoing message associated with the entry of state information. For purposes of illustration, the remote server may be server 16B.

Correlation unit 40 may then access state information received from the remote server, e.g., the state information from received from server-side dependency unit 18B of server 16B. Correlation unit 40 may determine whether a corresponding entry is present in the state information of server 16B that indicates a communication with server 16A. Correlation unit 40 may designate servers that bilaterally communicate as dependent servers.

According to aspects of this disclosure, correlation unit 40 may determine the server relationships based on the above-described network information of state information received from server-side dependency units 18. For example, as described in greater detail with the example of FIG. 3 below, correlation unit 40 may determine server relationships based on network information associated with a particular protocol, such as TCP/IP information. That is, correlation unit 40 may determine a source destination and a port number for outgoing messages of servers 16 based on TCP/IP information. Correlation unit 40 may correlate servers 16 (e.g., identify instances in which servers 16 exchange information) based on the source destination and port numbers. In this manner, correlation unit 40 may determine server dependencies.

Correlation unit 40 may also be configured to determine application dependencies. For example, correlation unit 40 may determine server to application dependencies (e.g., between one of servers 16 and one or more applications executed by other servers 16) and/or application to application dependencies (e.g., between an application executed by one of servers 16 and one or more applications executed by other servers 16). According to aspects of this disclosure, correlation unit 40 may determine the application dependencies based on the above-described process information of state information received form server-side dependency units 18.

For example, correlation unit 40 may determine a process identifier associated with a particular instance of network information (e.g., a process identifier associated with an outgoing message). Correlation unit 40 may then identify the corresponding process information associated with the process identifier. For example, correlation unit 40 may map the process identifier of the network information to the same process identifier of the process information or a particular instance of state information.

According to aspects of this disclosure, correlation unit 40 may then identify an application associated with the process identifier, which provides a link between determined server relationship and the application involved in the communication. For example, as noted above, the process information may include the process identifier as well as information that may be used to identify an application responsible for a particular communication. In some examples, the process information may indicate a directory from which the application is executed (e.g., a file directory from one of servers 16). In such examples, correlation unit 40 may determine the application based on the directory from which the application is executed.

For example, correlation unit 40 may receive fingerprint data 60 that maps directories to respective applications. That is, in some examples, fingerprint data 60 may be included in a fingerprint file and/or database and may indicates relationships between directories and applications associated with such directories. In some instances, the fingerprinting of applications may be derived from application build logs and/or well defined 3rd party software installs. For example, fingerprint data 60 may be derived from application build systems that programmatically push application code into specific directories of application servers from which the application will execute. In this example, a log file may be generated from the application build system that provides a mapping between the application and the directory from which the application is executed. Fingerprint data 60 may include (or be derived from) such a log file. In other examples, fingerprint data 60 may be manually generated and stored (e.g., by a system administrator with knowledge of the relationships between applications and corresponding directories).

Correlation unit 40 may locate the directory indicated by the process information in fingerprint data 60 and determine the corresponding application. That is, correlation unit 40 may map the directory from the process information to an application using the relationships included in fingerprint data 60. In this manner, correlation unit 40 may use the state information to determine application dependencies. For example, correlation unit 40 may map a particular process (as identified by a process identifier) responsible for communication to a destination using TCP and IP information associated with the destination. Correlation unit 40 may also map the process (as identified by the process identifier) to a directory associated with an application responsible for the communication. Correlation unit 40 may then map the directory associated with the application to the application using fingerprint data 60. Correlation unit 40 may perform the above-noted steps at each side of a conversation, e.g., at each side of a determined server dependency.

Correlation unit 40 may repeat the above-described processes for each instance of state data received from server-side dependency units 18. In this way, correlation unit 40 may generate a complete representation of dependencies between servers 16 and/or applications executed at servers 16. According to aspects of this disclosure, dependency determination unit 14 may determine and maintain both current and historical dependency data indicating dependencies of network 20. For example, dependency determination unit 14 may determine current dependencies for a given batch of state information (e.g., state information collected by server-side dependency units 18 for a given time period) and store the current dependencies to data store 50 as staging data 52. In some examples, correlation unit 40 may perform the dependency mapping using an Extract, Transform and Load (ETL) process driven by an SQL Server Integration Services (SSIS) platform.

Dependency determination unit 14 may also build comprehensive dependency data for a given time period by comparing the current dependencies for a given batch to results data 54 that includes previously identified dependencies. For example, dependency determination unit 14 may add new dependencies to results data 54 when staging data 52 includes a dependency that is not included in results data 54. Dependency determination unit 14 may also eliminate duplicate dependencies when staging data 52 includes a dependency that is already included in results data 54. Dependency determination unit 14 may also remove stale dependencies from results data 54 in instances in which a dependency has not occurred in a particular time period. Dependency determination unit 14 may also track the frequency with which a particular dependency occurs.

According to aspects of this disclosure, reporting unit 42 may generate data that indicates at least one of the determined server dependencies or the determined application dependencies. For example, reporting unit 42 may generate reports 64 based on staging data 52 and/or results data 54. Reports 64 may indicate the determined server dependencies and/or application dependencies.

In some instances, reporting unit 42 may transit the data that indicates the server and/or application dependencies to another computing unit for performing processes based on reports 64. For example, reporting unit 42 and/or reports 64 may be used by automated or manual processes for performing change impact analysis, design analysis, or business continuity planning analysis. As an example, the techniques of this disclosure may be used to identify dependencies associated with an enterprise application being changed (e.g., updated, removed, or migrated to a different application server). An automated or manual process may utilize the determined dependencies from reporting unit 42 to update applications and/or services in communication with the application being changed to ensure continued functionality.

Figure 4A:
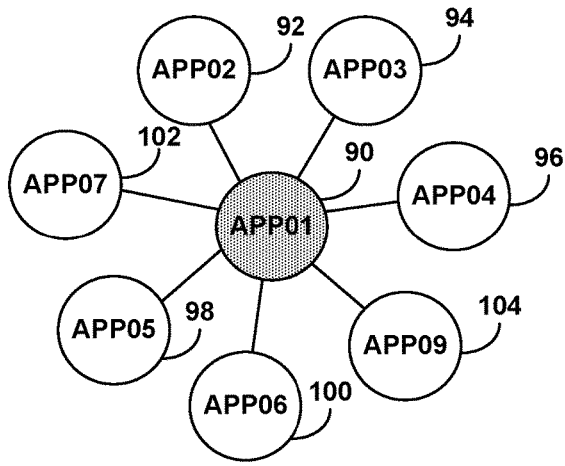
FIG. 4A is a conceptual diagram illustrating an application to application dependency map.
Figure 4B:
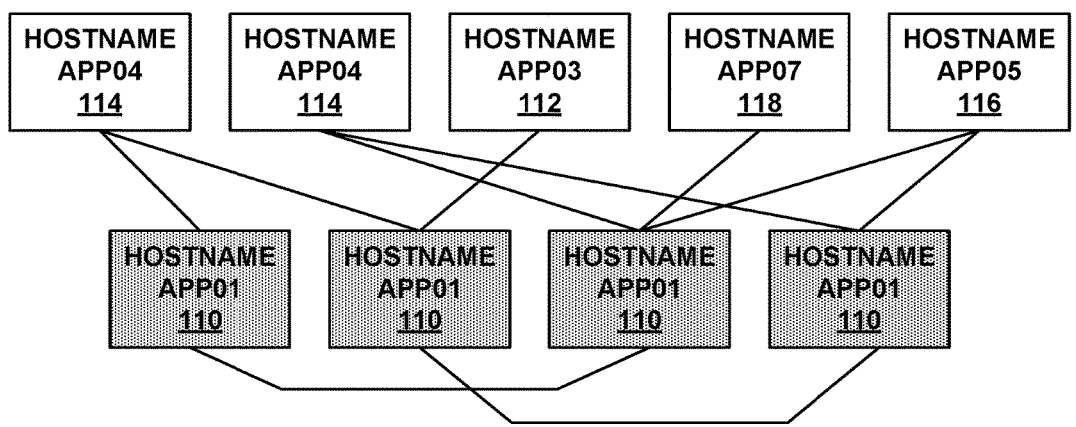
FIG. 4B is a conceptual diagram illustrating a application to server dependency map.
Figure 4C:
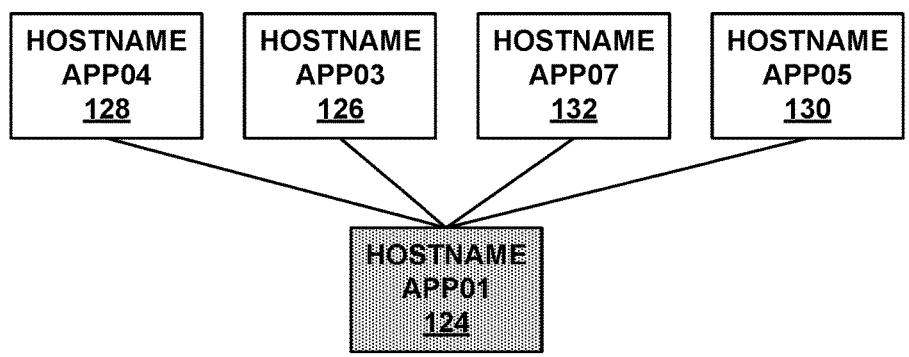
FIG. 4C is a conceptual diagram illustrating a server to server dependency map.

According to some aspects, reports 64 may include spreadsheets (e.g., Excel® spreadsheets) visualizations (e.g., Tableau® visualizations) or other text or graphical indications of dependencies. As illustrated in the examples of FIGS. 4A-4C below, reports 64 may indicate server to server relationships (e.g., between servers 16), server to application relationships (e.g., between one of servers 16 and one or more applications executed by other servers 16) and/or application to application relationships (e.g., between an application executed by one of servers 16 and one or more applications executed by other or servers 16). In some instances, reporting unit 42 may also interface with one or more other processes, such as a Web access management (WAM) system.

Figure 3:
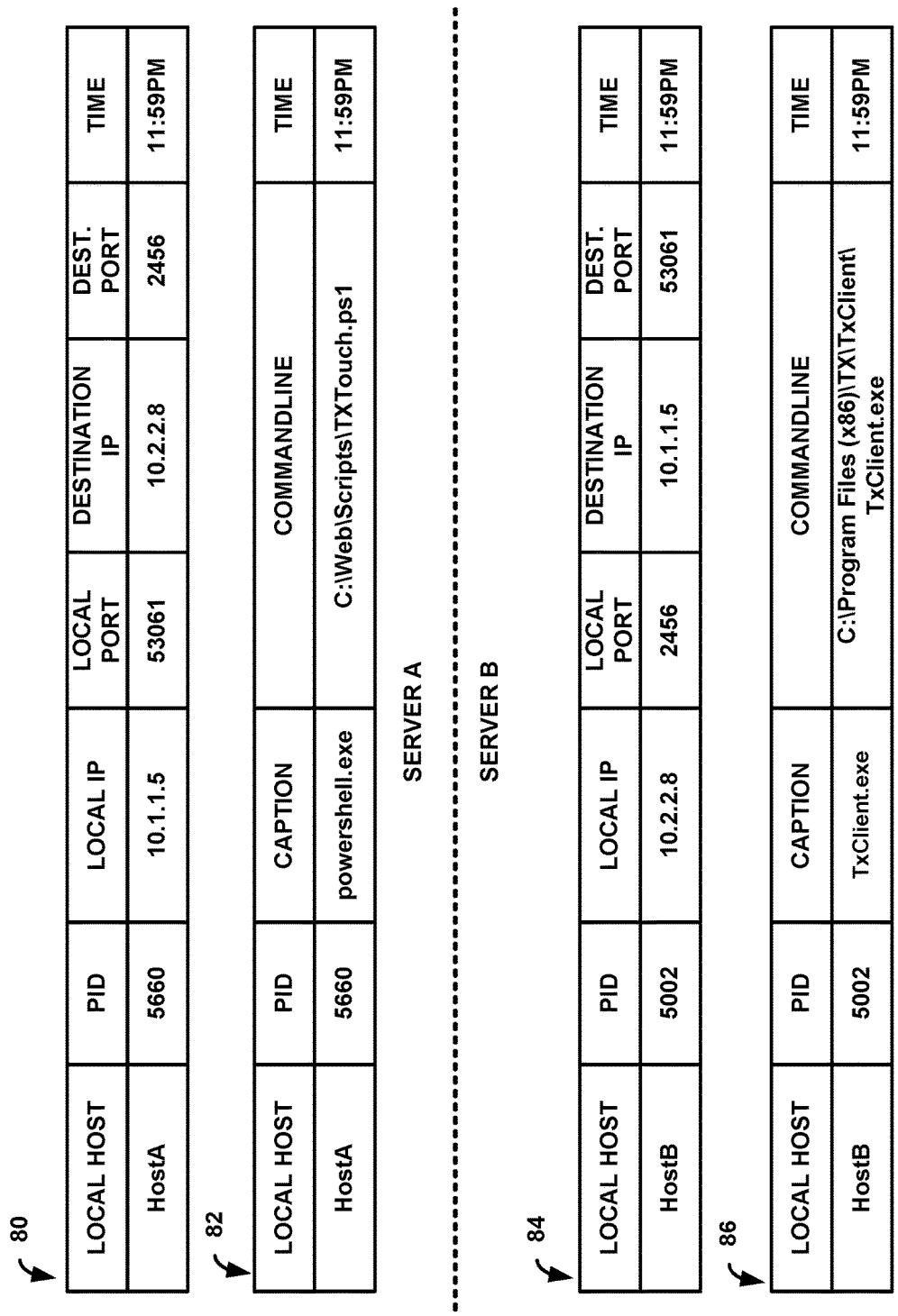
FIG. 3 illustrates state information that may be used to identify a network dependency between a first application operating on a first server and a second application operating on a second server.

FIG. 3 illustrates state information that may be used to identify a network dependency between a first application operating on a first server and a second application operating on a second server. For example, state information associated with Server A may include first network information 80 and first process information 82. State information associated with Server B may include second network information 84 and second process information 86. According to aspects of this disclosure, dependency determination unit 14 (FIGS. 1 and 2) may determine server to server dependencies, application to server dependencies, and/or application to application dependencies based on the state information shown in FIG. 3.

In the example of FIG. 3, first network information 80 includes a local host identifier (HostA) that uniquely identifies Server A. First network information 80 also includes a process identifier (PID) that indicates a process responsible for the communication (5660). As described herein, Server A may be responsible for assigning a unique PID to each process operating at Server A. In other examples, a variety of other data may be used to identify the process responsible for communication. First network information 80 also includes a local IP address (10.1.1.5) and a local port (e.g., local TCP data) (53061), which identify the source of the communication on the network. First network information 80 also includes a destination IP address (10.2.2.8) and a destination port (e.g., local TCP data) (2456), which identify the destination of the communication from Server A.

First process information 82 also includes the local host identifier (HostA) that uniquely identifies Server A and the process identifier (PID) that indicates a process responsible for the communication (5660). First process information 82 also includes a caption that identifies the actual process that is being executed (powershell.exe), as well as a command-line that indicates the directory associated with the process being executed (C:\Web\Scripts\TXTouch.ps1). Both first network information 80 and first process information 82 also include a time entry that reflects the time at which the state information is gathered (e.g., 11:59 PM).

Second network information 84 and second process information 86 include similar data as first network information 80 and first network information 82, but from the perspective of Server B. For example, second network information 84 includes a local host identifier (HostB) that uniquely identifies Server B. Second network information 84 also includes a process identifier (PID) that indicates a process responsible for the communication (5002). Second network information 84 also includes a local IP address (10.2.2.8) and a local port (e.g., local TCP data) (2456), which identify the source of the communication on the network. Second network information 84 also includes a destination IP address (10.1.1.5) and a destination port (e.g., local TCP data) (53061), which identify the destination of the communication from Server B.

Second process information 86 also includes the local host identifier (HostB) that uniquely identifies Server B and the process identifier (PID) that indicates a process responsible for the communication (5002). Second process information 86 also includes a caption that identifies the actual process that is being executed (TxClient.exe), as well as a commandline that indicates the directory associated with the process being executed (C:\Program Files (x86)\TX\TxClient\TxClient.exe). Both second network information 84 and second process information 68 also include a time entry that reflects the time at which the state information is gathered (e.g., 11:59 PM).

It should be understood that the particular content and/or arrangement of state information shown in FIG. 3 is provided for purposes of illustration only. For example, in some instances, network information and process information may be included in the same table and redundant data may be removed.

According to aspects of this disclosure, dependency determination unit 14 (FIGS. 1 and 2) may determine server to server dependencies, application to server dependencies, and/or application to application dependencies based on the state information shown in FIG. 3. For example, dependency determination unit 14 may determine a server dependency between Server A and Server B by determining that Server A communicates with Server B and vice versa (e.g., bilateral communication). Dependency determination unit 14 may identify the bilateral communication based on first network information 80 and second network information 84.

For example, dependency determination unit 14 may identify Server B as the destination of a message originating at Server A based on the destination IP and destination port of first network information 80. Dependency determination unit 14 may then access second network information 84 associated with Server B and determine that Server A is the destination of a message originating at Server B based on the destination IP and destination port of second network information 84. Dependency determination unit 14 may designate Server A and Server B as dependent servers based on the bilateral communication.

In some examples, according to aspects of this disclosure, dependency determination unit 14 may also identify one or more application dependencies based on first process information 82 and second process information 86. For example, dependency determination unit 14 may identify the PID associated with first network information 80. Dependency determination unit 14 may locate the same PID in first process information 82 and determine directory information (e.g., as included in the caption and/or commandline fields of first process information) associated with an application responsible for the communication. Dependency determination unit 14 may then locate the directory indicated by first process information 82 in a file or database that maps a directory to a respective application (such as fingerprint data 60 (FIG. 2)).

Dependency determination unit 14 may repeat the above-described process on second process information 86 associated with Server B to determine the application executed at Server B. Dependency determination unit 14 may then designate the application executed at Server A and the application executed at Server B as dependent applications. In this manner, dependency determination unit 14 may determine application to application dependencies between Server A and Server B.

As noted above, dependency determination unit 14 may additionally or alternatively determine application to server dependencies based on the state data shown in FIG. 3. For example, dependency determination unit 14 may identify Server B as the destination of the application associated with Server A based on first network information 80 (e.g., using the destination IP and destination port fields of first network information 80). Dependency determination unit 14 may also identify other instances of state information that correspond to the application for Server A and determine other server dependencies in the same manner.

FIGS. 4A-4C are example graphical representations of dependencies in a multi-server network. The illustrated examples may be generated by reporting unit 42 and included in reports 64 (FIG. 2). For example, reporting unit 42 may receive input from a user of computing device 12 that includes a user specified report type and/or view type for reports 64. The report type may specify whether the report generated by reporting unit 42 indicates dependencies associated with a server or with an application. The view type may specify whether the report generated by reporting unit 42 indicates dependent servers or applications for the selected report type. For example, a user may select a report type of "application" to determine dependencies for a particular application and a view type of "application" to view application dependencies for the particular application. In another example, a user may select a report type of "application" to determine dependencies for a particular application and a view type of "server" to view server dependencies for the particular application. In still another example, a user may select a report type of "server" to determine dependencies for a particular server and a view type of "server" to view server dependencies for the particular server.

FIG. 4A is a conceptual diagram illustrating an application to application dependency map. For example, reporting unit 42 may generate the graphical representation shown in FIG. 4A upon user selection of a report type of "application" for a targeted application (App01) 90 and a view type of "application." In the example shown in FIG. 4A, targeted application 90 has determined application dependencies (e.g., as determined using the processes described herein) with application 92 (App02), application 94 (App03), application 96 (App04), application 98 (App05), application 100 (App06), application 102 (App07), and application 104 (App09).

FIG. 4B is a conceptual diagram illustrating an application to server dependency map. For example, reporting unit 42 may generate the graphical representation shown in FIG. 4B upon user selection of a report type of "application" for a targeted application (Hostname App01) 110 and a view type of "server." In the example shown in FIG. 4B, targeted application 110 has determined server dependencies (e.g., as determined using the processes described herein) indicated by server hostnames including server 112 (Hostname App03), server 114 (Hostname App04), server 116 (Hostname App05), and server 118 (Hostname App07).

FIG. 4C is a conceptual diagram illustrating a server to server dependency map. For example, reporting unit 42 may generate the graphical representation shown in FIG. 4C upon user selection of a report type of "server" for a targeted server (Hostname App01) 124 and a view type of "server." In the example shown in FIG. 4C, targeted server 124 has determined server dependencies (e.g., as determined using the processes described herein) with server 126 (Hostname App03), server 128 (Hostname App04), server 130 (Hostname App05), and Server 132 (Hostname App07).

It should be understood that the examples shown in FIGS. 4A-4C are provided for purposes of illustration only, and that reporting unit 42 (FIG. 2) may generate other graphical or non-graphical reports that include more or fewer dependencies than those shown.

Figure 5:
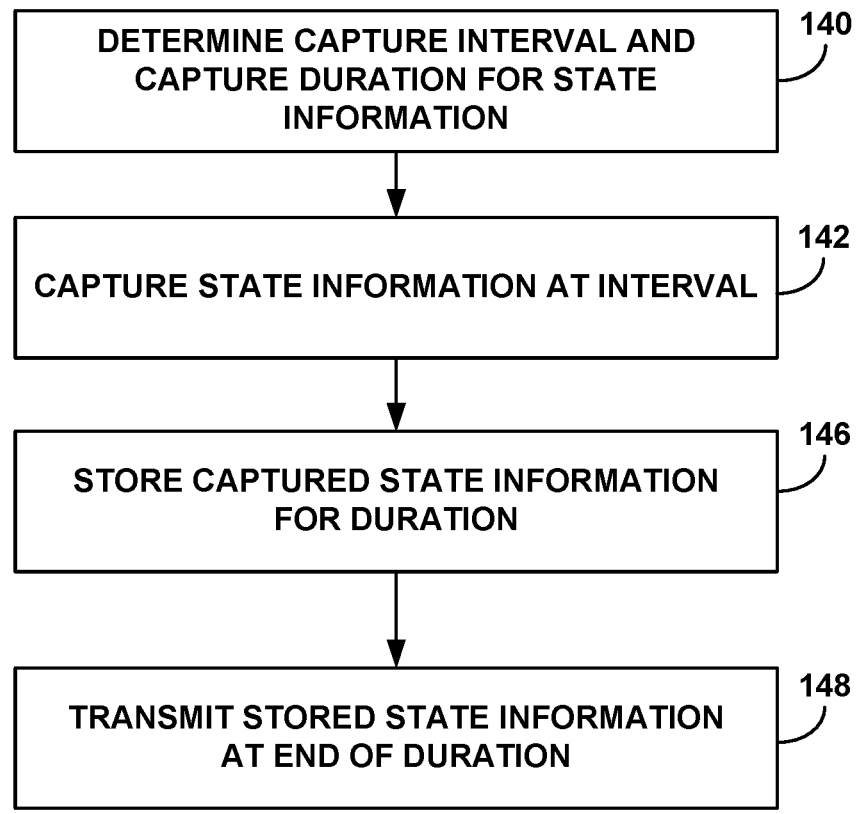
FIG. 5 is a flow diagram illustrating an example process for gathering and transmitting dependency data for determining dependencies in a networked environment.

FIG. 5 is a flow diagram illustrating an example process for gathering and transmitting dependency data for determining dependencies in a networked environment. While described with respect to computing system 10 (FIGS. 1 and 2), it should be understood that the process described with respect to FIG. 5 may be carried out by a variety of computing devices.

In the example of FIG. 5, server-side dependency units 18 may determine a capture interval and a capture duration for capturing state information associated with communications from respective servers 16 (140). In some examples, server-side dependency units 18 may store or obtain configuration information that dictates the intervals at which state information is captured (e.g., every minute, five minutes, ten minutes, or the like) and/or the duration that the state information is stored (e.g., 4 hours, 8 hours, 12 hours, 24 hours, or the like) prior to transmitting the state information to dependency determination unit 14. For example, the configuration instructions may cause server-side dependency units 18 to capture state information at a predetermined time, to increase or decrease the frequency with which state information is captured, to transmit stored state information to dependency determination unit 14, to stop capturing state data, or the like.

Server-side dependency units 18 may capture the state information at the determined interval and for the determined duration (142). For example, as described herein, server-side dependency units 18 may each identify outgoing messages at a particular instance in time. Server-side dependency units 18 may capture or generate the state information associated with the outgoing messages at regular intervals, such as the network information and the process information described herein. The state information may generally indicate a destination of the outgoing messages and may be used to determine an application that receives the outgoing messages. The interval with which the state information is captured and/or generated may be static or configurable.

In some examples, server-side dependency units 18 may store the captured state information for a particular duration (146). According to some aspects, server-side dependency units 18 may store the state information to a time-indexed table of state information. In some instances, server-side dependency units 18 may store network information of the state information separately from process information of the state information.

Server-side dependency units 18 may transmit the stored state information to another computing device responsible for determining dependencies at the end of the duration (148). For example, server-side dependency units 18 may send one or more files containing the captured state information to dependency determination unit 14.

Figure 6:
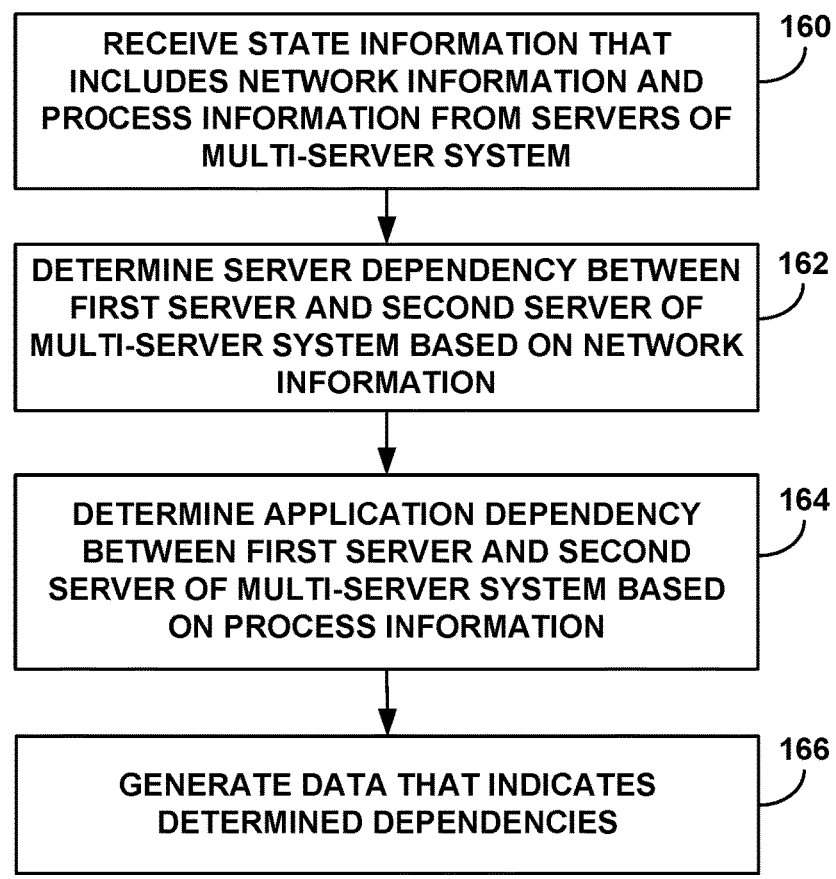
FIG. 6 is a flow diagram illustrating an example process for determining at least one dependency in a networked environment.

FIG. 6 is a flow diagram illustrating an example process for determining at least one dependency in a networked environment. While described with respect to computing system 10 (FIGS. 1 and 2), it should be understood that the process described with respect to FIG. 6 may be carried out by a variety of computing devices.

Dependency determination unit 14 may receive state information that includes network information and process information from servers 16 (160). Dependency determination unit 14 may determine server dependencies between a first server and a second server (e.g., such as server 16A and server 16B for purposes of illustration) based on the network information (162). For example, as described herein, dependency determination unit 14 may determine, for an entry of state information associated with a message from server 16A, a destination of the message (e.g., server 16B in this example). Dependency determination unit 14 may then determine, based on an analysis of state information from the destination (e.g., server 16B in this example), whether server 16A is the destination of messages from server 16B. If server 16A is the destination, dependency determination unit 14 determine a dependency based on the bilateral communication between server 16A and server 16B.

Dependency determination unit 14 may also determine, for the determined server dependency, an application dependency between the first server and the second server (164). For example, as described herein, dependency determination unit 14 may determine an application to server dependency or an application to application dependency. In either example, dependency determination unit 14 may determine the application dependency based on process information of the state information. For example, dependency determination unit 14 may determine a directory associated with an application responsible for an outgoing message. Dependency determination unit 14 may then map the directory to an application associated with the directory. For example, dependency determination unit 14 may determine the application based on application fingerprint data that maps the directory to the application.

In some instances, reporting unit 42 may generate data that indicates the determined dependencies (166). For example, reporting unit 42 may generate a text-based, graphical, or other report that indicates the determined dependencies. As noted above, in some instances, the report may be used to maintain or manage assets in a distributed computing environment. For example, the report may be transmitted to and used by automated or manual processes for performing change impact analysis, design analysis, or business continuity planning analysis.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:
1. A computer-implemented method comprising:
receiving, by one or more processors, first network information from a first server of a multi-server system, wherein the first network information has been obtained by the first server at a synchronized time at periodic intervals;
receiving, by the one or more processors, second network information from a second server of the multi-server system, wherein the second network information has been obtained by the second server at the synchronized time or approximately the synchronized time;
determining, by the one or more processors, a server dependency between the first server and the second server of the multi-server system based on the first network information received from the first server and the second network information received from the second server, wherein determining the server dependency comprises identifying a bilateral communication between the first server and the second server;
determining, by the one or more processors, for the determined server dependency, an application dependency between a first application executed at the first server and a second application executed at the second server, wherein determining the application dependency further comprises:
determining first directory information associated with the first application and indicated by a first process identifier assigned to the first application by the first server;
mapping the first directory information to the first application using an application identification file;
determining second directory information associated with the second application and indicated by a second process identifier assigned to the second application by the second server; and mapping the second directory information to the second application using the application identification file; and generating data that indicates at least one of the determined server dependency or the determined application dependency.

2. The method of claim 1, wherein identifying the bilateral communication comprises:
   determining that the second server is a destination for one or more messages transmitted from the first server; and
   determining that the first server is a destination for one or more messages transmitted by the second server.

3. The method of claim 2, further comprising:
   determining that the second server is the destination for the one or more messages from the first server based on the first network information included with the one or more messages from the first server; and
   determining that the first server is the destination for the one or more messages from the second server based on the second network information included with the one or more messages from the second server.

4. The method of claim 1,
   wherein identifying the bilateral communication between the first server and the second server comprises identifying the bilateral communication as having occurred at the synchronized time or approximately the synchronized time based on the received first network information and the received second network information.

5. The method of claim 4, further comprising configuring the first server and the second server to obtain the first network information and the second network information, respectively, at the synchronized time.

6. The method of claim 4, wherein receiving the first network information from the first server and the second network information from the second server further comprises configuring the first server and the second server to transmit the first network information and the second network information, respectively, at a predetermined time, different from the synchronized time.

7. The method of claim 1, wherein each of the first or second network information comprises at least one of an internet protocol (IP) address of one or more messages or transmission control protocol (TCP) data for the one or more messages.

8. The method of claim 1, wherein the application identification file is derived from at least one of application build logs or third-party software installs for the first and second applications.

9. A non-transitory computer-readable medium having instructions stored thereon that, when executed, cause one or more processors to:
   receive first network information from a first server of a multi-server system, wherein the first network information is time-indexed and has been obtained from the first server at a synchronized time at periodic intervals;
   receive second network information from a second server of the multi-server system, wherein the second network information is time-indexed and has been obtained from the second server at the synchronized time or approximately the synchronized time;
   determine a server dependency between the first server and the second server of the multi-server system based on the first network information received from the first server and the second network information received from the second server, wherein determining the server dependency comprises identifying a bilateral communication between the first server and the second server;
   determine for the determined server dependency, an application dependency between a first application executed at the first server and a second application executed at the second server, wherein to determine the application dependency, the instructions cause the one or more processors to:
   determine first directory information associated with the first application and indicated by a first process identifier assigned to the first application by the first server;
   map the first directory information to the first application using an application identification file;
   determine second directory information associated with the second application and indicated by a second process identifier assigned to the second application by the second server; and
   map the second directory information to the second application using the application identification file; and
   generate data that indicates at least one of the determined server dependency or the determined application dependency.

10. The non-transitory computer-readable medium of claim 9, wherein to identify the bilateral communication, the instructions cause the one or more processors to:
    determine that the second server is a destination for one or more messages transmitted from the first server based on the first network information included with the one or more messages from the first server; and
    determine that the first server is a destination for one or more messages transmitted by the second server based on the second network information included with the one or more messages from the second server.

11. The non-transitory computer-readable medium of claim 9,
    wherein to identify the bilateral communication between the first server and the second server, the instructions cause the one or more processors to identify the bilateral communication as having occurred at the synchronized time or approximately the synchronized time based on the received first network information and the received second network information.

12. The non-transitory computer-readable medium of claim 9, wherein each of the first or second network information comprises at least one of an internet protocol (IP) address of one or more messages or transmission control protocol (TCP) data for the one or more messages.

13. A computing system comprising:
    one or more processors of a first server of a multi-server system, the one or more processors configured to:
    capture network information at a predetermined time interval for a predetermined duration, wherein the network information is associated with one or more outgoing messages of the first server and indicates a destination of the one or more outgoing messages; and
    capture process information at the predetermined time interval for the predetermined duration, wherein the process information is associated with the one or more outgoing messages of the first server and indicates a process responsible for generating the one or more outgoing messages, and wherein the process information comprises a process identifier assigned to the process by the first server and configured to indicate directory information associated with the process; and a memory configured to store the captured network information and the captured process information over the predetermined duration, wherein the one or more processors are further configured to transmit, at the end of the predetermined duration, the captured network information and the captured process information from the first server to a computing device for determining at least one dependency between the first server and a second server of the multi-server system.

14. The computing system of claim 13, wherein the one or more processors are further configured to time-index the captured network data and the captured process data according to a time capture.

15. The computing system of claim 13, further comprising de-duplicating the captured network information and the captured process information during the predetermined duration.

\* \* \* \* \*